UNITED STATES PATENT OFFICE.

CHARLES E. HOUSE, OF YATES, MICHIGAN.

OIL-DRESSING FOR HARNESS.

SPECIFICATION forming part of Letters Patent No. 578,060, dated March 2, 1897.

Application filed April 20, 1896. Serial No. 588,376. (No specimens.)

*To all whom it may concern:*

Be it known that I, CHARLES E. HOUSE, of Yates, in the county of Manistee and State of Michigan, have invented an Improved Oil-Dressing for Harness, of which the following is a specification.

This invention is an improved leather-dressing intended for use upon harness, boots and shoes, valises, trunks, &c., and in fact all descriptions of leather goods.

The object of the invention is to provide a dressing which will give the leather a smooth black coat, one which will not harden or crack the leather, but on the other hand will soften and preserve the leather.

These objects I accomplish by the compound to be fully described hereinafter and pointed out in the claim.

In compounding my dressing I employ two pounds of extract of logwood for coloring and one-fourth of a pound of drop-black for the same purpose, one gallon of fish-oil to soften the leather, one-fourth of a pound of copperas, fifteen pounds of white Russian soap, one gallon of vinegar, one gallon of extract of potatoes, two pounds of melted rubber, two quarts of cottolene, and eight quarts of water.

The mixture is put together in any suitable manner and will keep for an indefinite period, and horses and cattle will not trouble it, nor will rats nor insects seek it.

The dressing can be applied with a sponge or cloth, and when thoroughly rubbed in gives the leather a soft glossy appearance, and shoes oiled with said dressing are made waterproof and keep the feet much warmer.

The extract of potatoes which is used in my composition is procured by putting the potatoes in the raw state into a press or other suitable machine and pressing the juice therefrom. The copperas which is used is the sulfate of iron or green vitriol. The melted rubber used is prepared by cutting the rubber in small pieces, then mixing with lard or fish-oil and heating the said mixture in a suitable receptacle. The so-called "Russian" soap is an extra fine quality of castile-soap, and cottolene is an oil made from cotton-seed and is generally used as a substitute for lard.

Having thus described my invention, what I claim, and desire to secure by Letters Patent, is—

An improved oil-dressing composed of logwood, drop-black, fish-oil, copperas, soap, vinegar, extract of potatoes, melted rubber, cottolene, and water, all in the proportions set forth.

In testimony whereof I affix my signature hereto in the presence of two witnesses.

CHARLES E. HOUSE.

Witnesses:
MARY A. BABCOCK,
HURMAN G. CARPENTER.